(12) United States Patent
Zhang

(10) Patent No.: US 8,335,169 B2
(45) Date of Patent: Dec. 18, 2012

(54) METHOD AND APPARATUS FOR PROCESSING BUFFER STATUS REPORT

(75) Inventor: Xiaodong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 12/914,627

(22) Filed: Oct. 28, 2010

(65) Prior Publication Data

US 2011/0038339 A1    Feb. 17, 2011

Related U.S. Application Data

(63) Continuation of application No. PCT/CN2009/071387, filed on Apr. 21, 2009.

(30) Foreign Application Priority Data

Apr. 28, 2008   (CN) .......................... 2008 1 0095058

(51) Int. Cl.
*H04L 12/26* (2006.01)
*H04L 12/28* (2006.01)
*H04L 12/56* (2006.01)

(52) U.S. Cl. .................... 370/252; 370/395.42; 370/414

(58) Field of Classification Search .................. 370/252, 370/310–350, 395.4, 464–465
See application file for complete search history.

(56) References Cited

U.S. PATENT DOCUMENTS

| | | | | |
|---|---|---|---|---|
| 7,289,821 B2* | 10/2007 | Kim et al. | | 455/512 |
| 7,881,203 B2* | 2/2011 | Ohsako et al. | | 370/235 |
| 8,165,066 B2* | 4/2012 | Tseng | | 370/328 |
| 8,223,708 B2* | 7/2012 | Guo | | 370/329 |
| 8,254,333 B2* | 8/2012 | Wu | | 370/331 |
| 2005/0078651 A1* | 4/2005 | Lee et al. | | 370/349 |
| 2007/0121542 A1* | 5/2007 | Lohr et al. | | 370/329 |
| 2009/0296637 A1* | 12/2009 | Fischer | | 370/328 |
| 2010/0074230 A1* | 3/2010 | Ishii et al. | | 370/336 |
| 2010/0135166 A1* | 6/2010 | Ahluwalia | | 370/252 |
| 2010/0232387 A1* | 9/2010 | Marchand et al. | | 370/329 |
| 2010/0254321 A1* | 10/2010 | Kim et al. | | 370/329 |
| 2010/0271990 A1* | 10/2010 | Leelahakriengkrai et al. | | 370/310 |
| 2010/0329135 A1* | 12/2010 | Pelletier et al. | | 370/252 |
| 2011/0044192 A1* | 2/2011 | Wang et al. | | 370/252 |
| 2011/0199991 A1* | 8/2011 | Harris et al. | | 370/329 |

FOREIGN PATENT DOCUMENTS

| CN | 16045685 A | 6/2005 |
|---|---|---|
| KR | 20080015693 A | 2/2008 |

OTHER PUBLICATIONS

XP003013941, 3GPP TSG-RAN WG2 Meeting #52, Mar. 27-31, 2006, Nokia, "Buffer Reporting for E-TRAN".*
International Search Report in corresponding PCT Application No. PCT/CN2009/071387, mailed Jul. 2, 2009.

(Continued)

*Primary Examiner* — Warner Wong
(74) *Attorney, Agent, or Firm* — Slater & Matsil, L.L.P.

(57) ABSTRACT

A method for processing a Buffer Status Report (BSR) is provided, which includes: acquiring service data with a higher priority than all service data waiting to be sent in a sending buffer; and prohibiting a sending process of the BSR from being triggered, if scheduling resources are available. An apparatus for processing a BSR is further provided.

18 Claims, 3 Drawing Sheets

Acquire service data with a higher priority than all service data waiting to be sent in a sending buffer. — S101

If available scheduling resources exist, a sending process of the BSR is prohibited from being triggered. — S102

OTHER PUBLICATIONS

"3$^{rd}$ Generation Partnership Project; Technical Specification Group Radio Access Network; Evolved Universal Terrestrial Radio Access (E-UTRA) Medium Access Control (MAC) protocol specification (Release 8)," 3GPP, 3GPP TS 36.321 V8.1.0 (Mar. 2008).

"3$^{rd}$ Generation Partnership Project; Technical Specification Group Radio Access Network; Evolved Universal Terrestrial Radio Access (E-UTRA) and Evolved Terrestrial Radio Access Network (E-UTRAN); Overall description; Stage 2 (Release 8)," 3GPP, 3GPP TS 36.300 V8.4.0 (Mar. 2008).

* cited by examiner

METHOD AND APPARATUS FOR PROCESSING BUFFER STATUS REPORT

CROSS-REFERENCE TO RELATED APPLICATIONS

This application is a continuation of International Application No. PCT/CN2009/071387, filed on Apr. 21, 2009, which claims priority to Chinese Patent Application No. 200810095058.3, filed on Apr. 28, 2008, both of which are hereby incorporated by reference in their entireties.

FIELD OF THE INVENTION

The present invention relates to the field of wireless communications technology, and more particularly to a technology for processing a Buffer Status Report (BSR).

BACKGROUND OF THE INVENTION

The Long Term Evolution (LTE) project is a mobile communications system intended to be launched by the 3rd Generation Partnership Project (3GPP) organization. In an existing LTE system, a Base Station (BS) uniformly schedules uplink data transmission of different User Equipment (UE), so as to improve the utilization of a channel. In a process of scheduling a UE by a BS, the UE needs to send an uplink scheduling information report to the BS, so that the BS may schedule the UE according to the uplink scheduling information report sent by the UE.

Among the uplink scheduling information reports, the most important is a BSR. Currently, a trigger condition for the sending process of the BSR proposed by the 3GPP LTE is that service data with a higher priority than all data waiting in a sending buffer of a UE arrives at the sending buffer of the UE.

However, the inventor found through detailed research of the prior art that in some cases, data of a certain service or services frequently arrives at the sending buffer of the UE. If the data of the services has a higher priority than all the data waiting in the sending buffer of the UE, the UE needs to frequently trigger the sending process of the BSR based on the preceding trigger condition for the sending process of the BSR, so that air interface resources are frequently occupied by the UE due to sending of the BSR.

SUMMARY OF THE INVENTION

The embodiments of the present invention are directed to a method and an apparatus for processing a BSR that are provided by the embodiments of the present invention, so as to save air interface resources.

A method for processing a BSR is provided. The method includes: acquiring service data with a higher priority than all service data waiting to be sent in a sending buffer; and prohibiting a sending process of the BSR from being triggered, if scheduling resources are available.

An apparatus for processing a BSR is provided. The apparatus includes an acquisition unit and a BSR processing unit. The acquisition unit is configured to acquire service data with a higher priority than all service data waiting to be sent in a sending buffer. The BSR processing unit is configured to prohibit a sending process of the BSR from being triggered when the following conditions are satisfied: if scheduling resources are available, and after the acquisition unit acquires the service data with the higher priority than all the service data waiting to be sent in the sending buffer.

According to the embodiments of the present invention, after a UE acquires service data with a higher priority than all the service data waiting to be sent in the sending buffer, the sending process of the BSR may not be triggered even though scheduling resources are available. However, in the prior art, the sending process of the BSR is consequentially triggered when the UE acquires the service data with the higher priority than all the service data waiting to be sent in the sending buffer. Therefore, the embodiments of the present invention prevent the technical problem of the prior art, that is, the air interface resources are not frequently occupied by the UE due to the frequent triggering of the sending process of the BSR. Accordingly, compared with the prior art, the embodiments of the present invention can save the air interface resources.

DETAILED DESCRIPTION OF THE EMBODIMENTS

Figure 1:
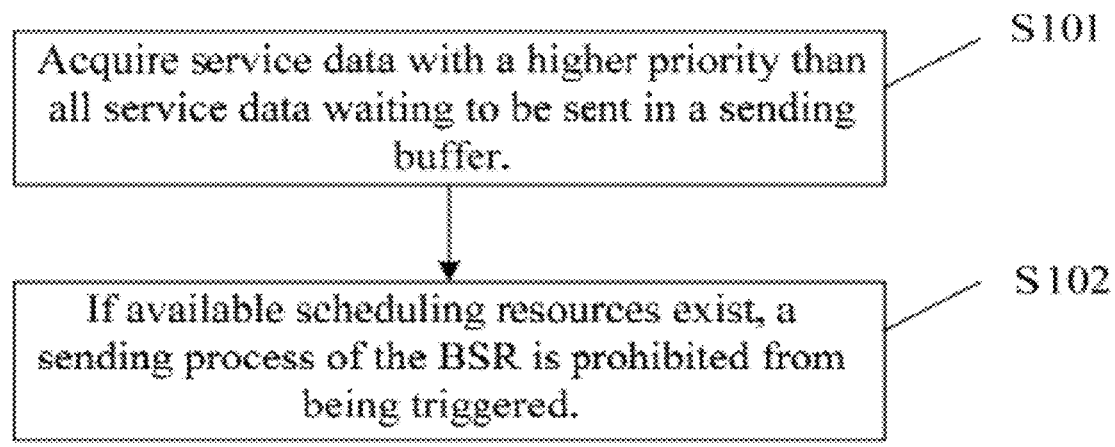
FIG. 1 is a flow chart of a method for processing a BSR according to an embodiment of the present invention.

A method for processing a BSR is described first. As shown in FIG. 1, the method includes the following steps.

Step S101: Acquire service data with a higher priority than all service data waiting to be sent in a sending buffer.

The sending buffer may be a sending buffer of a Media Access Control (MAC) layer. The sending buffer may temporarily store the service data waiting to be sent. The service data waiting to be sent may be service data of the same service waiting to be sent, or service data of different services waiting to be sent.

Each service may correspond to a priority, and the priority of the service data is correlated to the priority of the service. If the priority of Service 1 is higher than the priority of Service 2 and the priority of Service 2 is higher than the priority of Service 3, the priority of service data of Service 1 is higher than the priority of service data of Service 2 and the priority of service data of Service 2 is higher than the priority of service data of Service 3. Generally, in the sending buffer, service data with the highest priority is sent first. When service data with a high priority arrives at the sending buffer, the service data sent first is generally the service data with the high priority, even if service data with a low priority has been temporarily stored in the sending buffer for a long period of time.

Services corresponding to the service data that is temporarily stored in the sending buffer may be of different types, and may be, for example, static scheduling services, semi-persistent scheduling (sps) services, or dynamic scheduling services.

In static scheduling, scheduling resources configured by a BS for a service are persistently effective, and a UE always uses the scheduling resources to send service data of the service.

In semi-persistent scheduling, scheduling resources configured by the BS for the service may be persistently effective, but in some special cases, for example, when the configured scheduling resources cannot meet the practical demands, the BS may configure new scheduling resources for the service again.

In dynamic scheduling, the BS may configure scheduling resources for the service at any moment, without configuring persistent scheduling resources for the service.

Step S102: Prohibit a sending process of the BSR from being triggered if scheduling resources are available.

The scheduling resources may be one or both of scheduling resources as follows: scheduling resources configured by the BS for a service that corresponds to the service data with the higher priority mentioned in step S101, and all or part of scheduling resources configured by the BS for services that correspond to all the service data waiting to be sent in the sending buffer mentioned in step S101.

In addition, if scheduling resources are unavailable, the sending process of the BSR is triggered.

Before step S102, a step of determining whether scheduling resources are available may be performed. For example, it may be determined whether the scheduling resources configured by the BS for the service exist, where the service corresponds to the service data with the higher priority mentioned in step S101, or whether the scheduling resources configured by the BS for the service are available, where the service corresponds to the service data with the higher priority mentioned in step S101. If the scheduling resources configured by the BS for the service exist or the scheduling resources configured by the BS for the service are available, the sending process of the BSR is prohibited from being triggered; if the scheduling resources configured by the BS for the service do not exist or the scheduling resources configured by the BS for the service are unavailable, the sending process of the BSR is triggered. For another example, it may be determined whether all or part of the scheduling resources configured by the BS for the services exist, where the services correspond to all the service data waiting to be sent in the sending buffer mentioned in step S101, or whether all or part of the scheduling resources configured by the BS for the services are available, where the services correspond to all the service data waiting to be sent in the sending buffer mentioned in step S101. If all or part of the scheduling resources configured by the BS for the services exist or all or part of the scheduling resources configured by the BS for the services are available, the sending process of the BSR is prohibited from being triggered; if all or part of the scheduling resources configured by the BS for the services do not exist or all or part of the scheduling resources configured by the BS for the services are unavailable, the sending process of the BSR is triggered. For another example, it may be determined whether any one of the above two types of scheduling resources is available, where the above two types of scheduling resources contain the scheduling resources configured by the BS for the service corresponding to the service data with the higher priority mentioned in step S101, and all or part of the scheduling resources configured by the BS for the services corresponding to all the service data waiting to be sent in the sending buffer mentioned in step S101. If any one of the above two types of scheduling resources is available, the sending process of the BSR is prohibited from being triggered; otherwise, the sending process of the BSR is triggered.

Further, after the sending process of the BSR is triggered, the scheduling resources configured by the BS for the service that corresponds to the service data with the higher priority mentioned in step S101 are acquired. If service data of the service that corresponds to the service data with the higher priority mentioned in step S101 is received subsequently, and the scheduling resources configured by the BS for the service that corresponds to the service data with the higher priority mentioned in step S101 are available, the sending process of the BSR is still prohibited from being triggered. That is, if scheduling resources need to be requested for a certain service from the BS at an occasion, when service data of the service is received at a next occasion, the scheduling resources previously configured by the BS may be used, so that the sending process of the BSR does not need to be triggered. If the scheduling resources previously configured by the BS are unavailable when the service data of the service is received at the next occasion, the sending process of the BSR needs to be triggered. For example, the BSR may be a Regular BSR.

Alternatively, the service data with the higher priority mentioned in step S101 may be semi-persistent scheduling service data, and correspondingly, the scheduling resources may be semi-persistent scheduling resources. For example, the service that corresponds to the service data with the higher priority is a Voice over Internet Protocol (VoIP) service.

To enable those skilled in the art to understand the embodiments of the present invention more clearly, the present invention is further described below by taking the VoIP service as an example.

Figure 2:
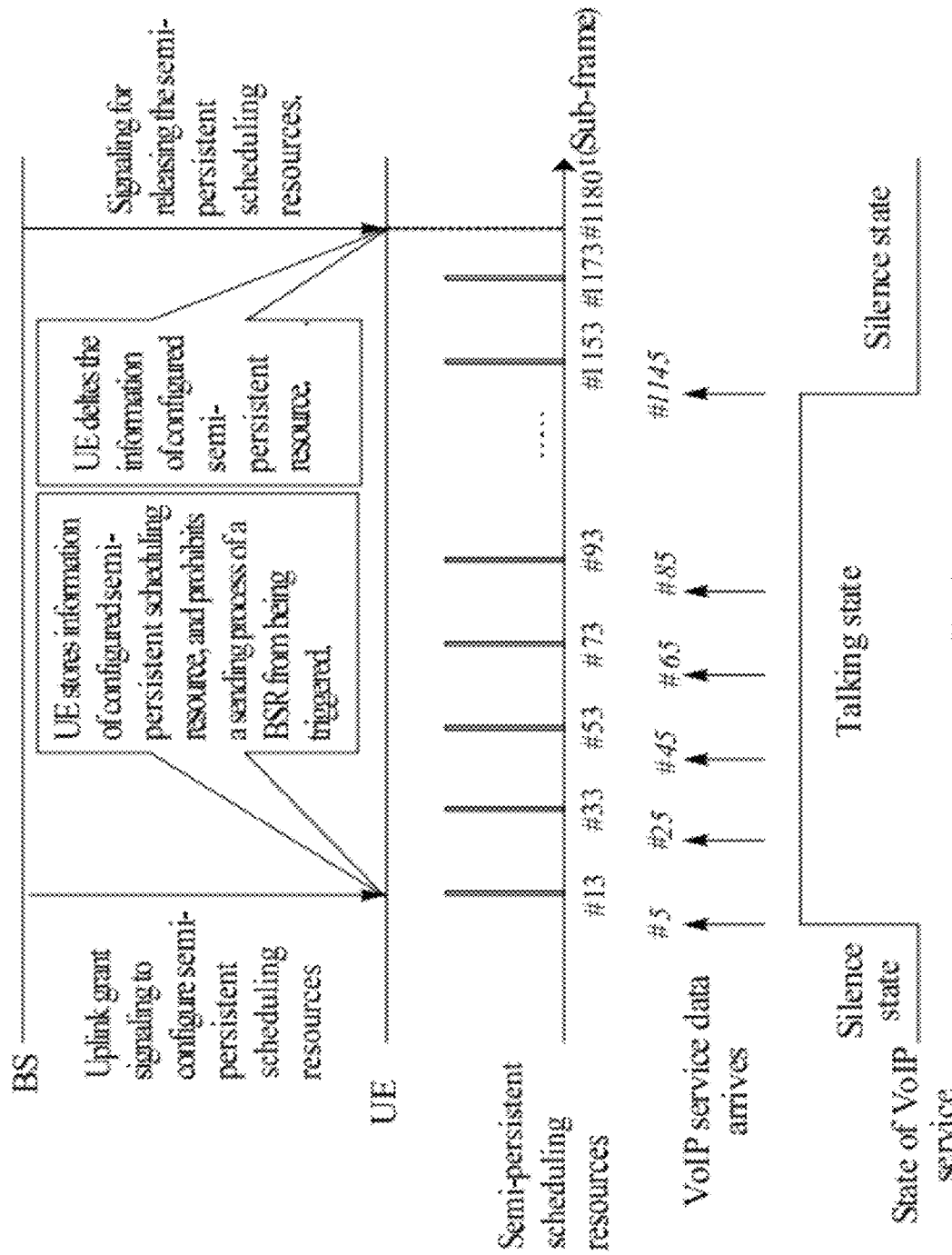
FIG. 2 is a schematic diagram of Embodiment 1 of the present invention.

Embodiment 1: It is assumed that an uplink VoIP service is semi-persistent scheduled, and a semi-persistent scheduling resource interval is configured to be 20 milliseconds (ms). A BS configures semi-persistent resources for the uplink VoIP service in a Talking state. When the uplink VoIP service enters a Silence state, the BS releases the semi-persistent resources configured thereto. As shown in FIG. 2, the uplink VoIP service is initially in the Silence state. At a sub-frame #5, the uplink VoIP service enters the Talking state and a first VoIP packet arrives. Since then, there is a VoIP packet arriving every 20 ms. After determining that the uplink VoIP service enters the Talking state, the BS configures semi-persistent resources with beginning of a sub-frame #13, and at an interval of 20 ms to the uplink VoIP service through an uplink grant signaling. After receiving the uplink grant signaling, a UE stores information of the configured semi-persistent scheduling resources, and determines that the semi-persistent scheduling resources are available every 20 ms. Further, for all the data of the uplink VoIP service that arrives subsequently, a sending process of a BSR is prohibited from being triggered.

It is further assumed that the uplink VoIP service enters the Silence state at a sub-frame #1145. After detecting that the uplink VoIP service enters the Silence state, the BS sends a signaling of releasing the semi-persistent scheduling resources to the UE at a sub-frame #1180. After receiving the signaling, the UE deletes the stored information of the configured semi-persistent scheduling resources. When the uplink VoIP service enters the Talking state again, the sending process of the BSR is triggered.

Embodiment 2: This embodiment is basically the same as Embodiment 1. The difference between the two embodiments lies in that, after the UE deletes the stored information of the configured semi-persistent scheduling resources and the uplink VoIP service enters the Talking state again, the sending process of the BSR may be prohibited from being triggered when the following condition is met: if scheduling resources configured for other services by the BS are available. In other words, the UE may use the scheduling resources configured for other services by the BS to send the service data of the uplink VoIP service, that is, the UE preempts the scheduling resources configured for other services. If the scheduling resources configured for other services by the BS are unavailable either, the sending process of the BSR is triggered.

In practical applications, the scheduling resources configured for other services by the BS may be static scheduling resources, semi-persistent scheduling resources, or dynamic scheduling resources. As both the static scheduling resources and the semi-persistent scheduling resources configured by the BS are persistently available for a service, even if the static scheduling resources or the semi-persistent scheduling resources are preempted for the uplink VoIP service, the data of other services may also be sent in a subsequent resource configuration cycle, so that the influence on the sending of the data of other services is not serious. Therefore, when the UE needs to send the service data of the uplink VoIP service and scheduling resources configured for the uplink VoIP service are unavailable, preempting the static scheduling resources or the semi-persistent scheduling resources of other services for the uplink VoIP service is technically preferred.

In addition, the scheduling resources configured for other services may refer to scheduling resource configured for another service, or scheduling resources configured for a plurality of other services. In the process of preempting the scheduling resource, the scheduling resources configured for one service may be randomly selected, or the scheduling resources may also be selected based on a certain rule, for example, scheduling resources configured for a service with the lowest priority are selected for preemption. For example, in Embodiment 2, it is assumed that the priority of Service 1 is higher than the priority of Service 2, and the priority of Service 2 is higher than the priority of Service 3, and all the scheduling resources configured for Services 1, 2 and 3 may be configured to send the service data of the uplink VoIP service, so that the scheduling resources configured for Service 3 are selected for preemption when the scheduling resources configured for Services 1, 2 and 3 need to be preempted.

In the course of implementing the embodiments of the present invention, even though the scheduling resources configured for a plurality of other services may be preempted, it is still possible that the scheduling resource configured for each single other service cannot satisfy the sending conditions of service data that currently needs to be sent. For example, a service data packet that currently needs to be sent is so large that the service data packet cannot be sent only through the scheduling resource configured for each single other service. In this case, all or a part of the resources may be integrated so that the integrated scheduling resources may satisfy the sending conditions of the service data that currently needs to be sent. For example, in Embodiment 2, it is assumed that all the scheduling resources configured for Services 1, 2 and 3 may be preempted, but each single the scheduling resource cannot satisfy the sending conditions of the service data packet of the uplink VoIP service, and the scheduling resources may be integrated and then configured to send the service data packet of the uplink VoIP service. when the service data packet of the uplink VoIP service needs to be sent, the scheduling resources configured for Services 1, 2 and 3 are preempted and then integrated. Therefore, the integrated scheduling resources are used to send the service data packet of the uplink VoIP service.

It should be noted that in the above method, when the service data with the higher priority is acquired, the sending process of the BSR may be triggered based on the specifications in the existing protocol if the condition that scheduling resources corresponding to the above service exist is satisfied, and other conditions for triggering the sending process of the BSR that are specified in an existing protocol are also satisfied. For example, when the service data packet of the uplink VoIP service is acquired, the sending process of the BSR may be triggered if the BS has configured semi-persistent resources for the uplink VoIP service, and the size of the service data packet exceeds a preset threshold. This technical means is optional.

It should be further noted that the performer of step S101, step S102, and the step of determining whether scheduling resources are available may be the UE, and in a specific example, may be a certain functional unit(s) of the MAC layer.

Furthermore, after acquiring the BSR triggered by the UE, the BS may configure scheduling resources for the UE based on a certain strategy according to the conditions of the scheduling resources and all the BSRs reported by the UE. For example, the BS generates grant information configured to notify the UE of the information of the scheduling resources, and sends the grant information to the UE. After receiving the grant information, the UE uses the scheduling resources configured by the BS to send the service data.

Figure 3:
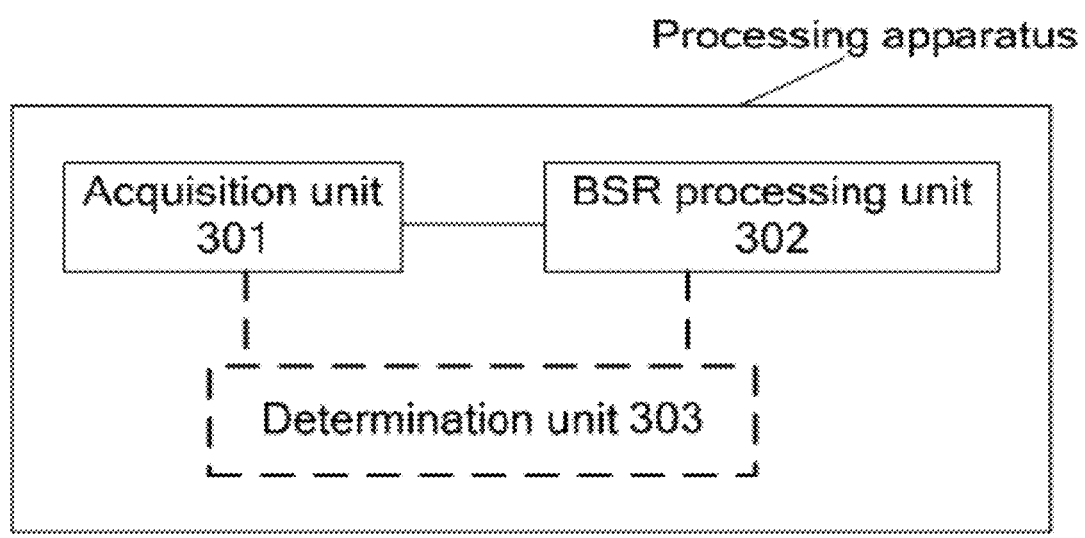
FIG. 3 is a schematic structural view of an apparatus for processing a BSR according to an embodiment of the present invention.

The above method may be implemented by various forms of apparatus, and accordingly, in an embodiment, the present invention provides an apparatus for processing a BSR. As shown in FIG. 3, the apparatus includes an acquisition unit 301 and a BSR processing unit 302. The acquisition unit 301 is configured to acquire service data with a higher priority than all service data waiting to be sent in a sending buffer. The BSR processing unit 302 is configured to prohibit a sending process of the BSR from being triggered when the following conditions are satisfied: if scheduling resources are available, and after the acquisition unit 301 acquires the service data with the higher priority than all the service data waiting to be sent in the sending buffer.

The sending buffer may temporarily store the service data waiting to be sent. The service data waiting to be sent may be service data of the same service waiting to be sent, or service data of different services waiting to be sent.

Each service may correspond to a priority. Generally, in the sending buffer, service data with the highest priority is sent first. When service data with a high priority arrives at the sending buffer, the service data sent first is generally the service data with the high priority, even if service data with a low priority has been temporarily stored in the sending buffer for a long period of time.

Services corresponding to the service data that is temporarily stored in the sending buffer may be of different types, and may be, for example, static scheduling services, semi-persistent scheduling services, or dynamic scheduling services.

In static scheduling, scheduling resources configured by a BS for a service are persistently effective, and a UE always uses the scheduling resources to send service data of the service.

In semi-persistent scheduling, scheduling resources configured by the BS for the service may be persistently effective, but in some special cases, for example, when the configured scheduling resources cannot meet the practical demands, the BS may configure new scheduling resources for the service again.

In dynamic scheduling, the BS may configure scheduling resources for the service at any moment, without configuring persistent scheduling resources for the service.

Herein, the scheduling resources may be any one or both of scheduling resources as follows: scheduling resources configured by the BS for a service that corresponds to the service data with the higher priority, or all or part of scheduling resources configured by the BS for services that correspond to all the service data waiting to be sent in the sending buffer.

Moreover, after the acquisition unit 301 acquires the service data with the higher priority than all the service data waiting to be sent in the sending buffer, if scheduling resources are unavailable, the BSR processing unit 302 may trigger the sending process of the BSR.

Furthermore, the above apparatus may further include a determination unit 303. The determination unit 303 is configured to determine whether scheduling resources are available after the acquisition unit 301 acquires the service data with the higher priority than all the service data waiting to be sent in the sending buffer, and provide a determination result to the BSR processing unit 302. Specifically, the determination unit 303 may determine whether the scheduling resources configured by the BS for the service exist, where the service corresponds to the service data with the higher priority, or whether the scheduling resources configured by the BS for the service are available, where the service corresponds to the service data with the higher priority. If the scheduling resources configured by the BS for the service exist or the scheduling resources configured by the BS for the service are available, the BSR processing unit 302 prohibits the sending process of the BSR from being triggered; if the scheduling resources configured by the BS for the service do not exist or the scheduling resources configured by the BS for the service are unavailable, the BSR processing unit 302 triggers the sending process of the BSR. For another example, the determination unit 303 may determine whether all or part of the scheduling resources configured by the BS for the services exist, where the services correspond to all the service data waiting to be sent in the sending buffer, or whether all or part of the scheduling resources are available, where the services correspond to all the service data waiting to be sent in the sending buffer. If all or part of the scheduling resources configured by the BS for the services exist or all or part of the scheduling resources configured by the BS for the services are available, the BSR processing unit 302 prohibits the sending process of the BSR from being triggered; if all or part of the scheduling resources configured by the BS for the services do not exist or all or part of the scheduling resources configured by the BS for the services are unavailable, the BSR processing unit 302 triggers the sending process of the BSR. For another example, the determination unit 303 may determine whether any one of the above two types of scheduling resources is available, where the above two types of scheduling resources contain the scheduling resources configured by the BS for the service corresponding to the service data with the higher priority, and all or part of the scheduling resources configured by the BS for the services corresponding to all the service data waiting to be sent in the sending buffer. If any one of the above two types of scheduling resources is available, the BSR processing unit 302 prohibits the sending process of the BSR from being triggered; otherwise, the BSR processing unit 302 triggers the sending process of the BSR.

After the BSR processing unit 302 triggers the sending process of the BSR, the acquisition unit 301 may acquire the scheduling resources configured by the BS for the service that corresponds to the service data with the higher priority. If service data of the service that corresponds to the service data with the higher priority is received by the acquisition unit 301 subsequently, and the scheduling resources configured by the BS for the service that corresponds to the service data with the higher priority are available, the BSR processing unit 302 may still prohibit the sending process of the BSR from being triggered. That is, if the apparatus for processing a BSR needs to request scheduling resources for a certain service from the BS at an occasion, when the acquisition unit 301 receives service data of the service at a next occasion, the apparatus for processing a BSR may use the scheduling resources previously configured by the BS, so that the BSR processing unit 302 does not need to trigger the sending process of the BSR. If the scheduling resources previously configured by the BS are unavailable when the acquisition unit 301 receives the service data of the service at the next occasion, the BSR processing unit still needs to trigger the sending process of the BSR.

It should be noted that the functional units in the apparatus for processing a BSR may be arranged or applied in the UE, for example, the acquisition unit 301 may be an antenna apparatus of the UE, or a receiving apparatus in the MAC layer which is responsible for receiving data sent from higher layers, and operating modes of the functional units of the apparatus for processing a BSR in the UE are the same as those in the above apparatus, so that the details are not described herein again.

In all the embodiments of the present invention, after receiving service data with a higher priority than all the service data waiting to be sent in the sending buffer, the UE does not simply trigger the sending process of the BSR, but whether scheduling resources are available is determined, and if scheduling resources are available, the UE does not need to trigger the sending process of the BSR. Compared with the prior art, in the embodiments of the present invention, the UE does not need to trigger the sending process of the BSR frequently, thereby saving the air interface resources.

Skilled persons in the art could understand that all or part of the processes in the method according to the embodiments may be implemented by a computer program instructing relevant hardware. The program may be stored in a computer readable storage medium. When the program is executed, the processes of the method according to the embodiments of the present invention are performed. The above storage medium may be a magnetic disk, a Compact Disk, a Read-Only Memory (ROM) or a Random Access Memory (RAM).

It should be noted that the above descriptions are merely preferred embodiments of the present invention, and those skilled in the art may make various improvements and refinements without departing from the spirit of the invention. All such modifications and refinements are intended to be covered by the present invention.

What is claimed is:

1. A method for processing a Buffer Status Report (BSR), comprising:
   acquiring, by a user equipment (UE), service data with a higher priority than all service data waiting to be sent in a sending buffer;
   prohibiting, by the UE, a sending process of the BSR from being triggered after the UE acquiring the service data with the higher priority than all service data waiting to be sent in a sending buffer, and if scheduling resources are available, wherein the scheduling resources are used for sending the service data with the higher priority than all service data waiting to be sent in a sending buffer,
   wherein after the acquiring the service data with the higher priority than all the service data waiting to be sent in the sending buffer, the method further comprises: triggering the sending process of the BSR, if scheduling resources are unavailable.

2. The method according to claim 1, wherein after the triggering the sending process of the BSR, the method further comprises:
   acquiring scheduling resources configured by a Base Station (BS) for a service that corresponds to the service data with the higher priority; and
   prohibiting the sending process of the BSR from being triggered, if service data of the service that corresponds to the service data with the higher priority is received subsequently, and the scheduling resources configured by the BS for the service that corresponds to the service data with the higher priority are available.

3. The method according to claim 1, wherein the prohibiting the sending process of the BSR from being triggered if the scheduling resources are available comprise:
prohibiting a sending process of the BSR from being triggered, if scheduling resources configured by a BS for a service exist or the scheduling resources configured by the BS for the service are available, wherein the service corresponds to the service data with the higher priority.

4. The method according to claim 1, wherein the prohibiting a sending process of the BSR from being triggered if scheduling resources are available comprise:
prohibiting a sending process of the BSR from being triggered, if all or part of scheduling resources configured by a BS for services exist or all or part of the scheduling resources configured by the BS for services are available wherein the services correspond to all the service data waiting to be sent in the sending buffer.

5. The method according to claim 1, wherein the service data with the higher priority is semi-persistent scheduling service data, and the scheduling resources are semi-persistent scheduling resources.

6. The method according to claim 1, further comprising:
determining that the scheduling resources are available if information of configured semi-persistent scheduling resources is stored.

7. The method according to claim 1, wherein the service that corresponds to the service data with the higher priority is a Voice over Internet Protocol (VoIP) service, and the scheduling resources are semi-persistent scheduling resources.

8. The method according to claim 1, further comprising:
preempting scheduling resources configured by a BS for one service different from a service that corresponds to the service data with the higher priority wherein the scheduling resources configured by the BS for the service different from the service that corresponds to the service data with the higher priority are available.

9. The method according to claim 1, further comprising:
preempting scheduling resources configured by a BS for a plurality of services different from a service that corresponds to the service data with the higher priority wherein the scheduling resources configured by the BS for a plurality of services different from the service that corresponds to the service data with the higher priority are available are available; and
integrating the scheduling resources configured by the BS for a plurality of services different from the service that corresponds to the service data with the higher priority to satisfy sending conditions of the service data with the higher priority.

10. An apparatus for processing a Buffer Status Report (BSR), comprising:
an acquisition unit, configured to acquire service data with a higher priority than all service data waiting to be sent in a sending buffer; and
a BSR processing unit, configured to prohibit a sending process of the BSR from being triggered when the following conditions are satisfied: if scheduling resources are available, and after the acquisition unit acquires the service data with the higher priority than all the service data waiting to be sent in the sending buffer, wherein the scheduling resources are used for sending the service data with the higher priority than all service data waiting to be sent in a sending buffer,
wherein the BSR processing unit is further configured to trigger the sending process of the BSR if scheduling resources are unavailable, after the acquisition unit acquires the service data with the higher priority than all the service data waiting to be sent in the sending buffer.

11. The apparatus according to claim 10, further comprising:
a determination unit, configured to determine whether the scheduling resources are available after the acquisition unit acquires the service data with the higher priority than all the service data waiting to be sent in the sending buffer, and provide a determination result to the BSR processing unit.

12. The apparatus according to claim 10, wherein the condition that the scheduling resources are available is satisfied when the BSR processing unit determines scheduling resources configured by a BS for a service exist or the scheduling resources configured by the BS for the service are available, wherein the service corresponds to the service data with the higher priority.

13. The apparatus according to claim 10, wherein the condition that the scheduling resources are available is satisfied when the BSR processing unit determines all or part of scheduling resources configured by a BS for services exist or all or part of the scheduling resources configured by the BS for services are available, wherein the services correspond to all the service data waiting to be sent in the sending buffer.

14. The apparatus according to claim 10, wherein the service data with the higher priority is semi-persistent scheduling service data, and the scheduling resources are semi-persistent scheduling resources.

15. The apparatus according to claim 10, wherein the service that corresponds to the service data with the higher priority is a Voice over Internet Protocol (VoIP) service and the scheduling resources are semi-persistent scheduling resources.

16. The apparatus according to claim 10, wherein the BSR processing unit is further configured to preempt scheduling resources configured by a BS for one service different from a service corresponding to the service data with the higher priority wherein the scheduling resources configured by the BS for the service different from the service that corresponds to the service data with the higher priority are available.

17. The apparatus according to claim 10, wherein the BSR processing unit is further configured to preempt scheduling resources configured by a BS for a plurality of services different from a service that corresponds to the service data with the higher priority wherein the scheduling resources configured by the BS for a plurality of services different from the service that corresponds to the service data with the higher priority are available are available, and integrate the scheduling resources configured by the BS for a plurality of services different from the service that corresponds to the service data with the higher priority to satisfy sending conditions of the service data with the higher priority.

18. The apparatus according to claim 10, wherein the apparatus is User Equipment (UE).

* * * * *